US007830794B2

(12) United States Patent
Jutzi

(10) Patent No.: US 7,830,794 B2
(45) Date of Patent: Nov. 9, 2010

(54) METHOD AND APPARATUS FOR IMPROVED ISOCHRONOUS DATA DELIVERY OVER NON-ISOCHRONOUS COMMUNICATION FABRIC

(75) Inventor: Curtis E. Jutzi, Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 756 days.

(21) Appl. No.: 11/393,057

(22) Filed: Mar. 29, 2006

(65) Prior Publication Data

US 2007/0237073 A1  Oct. 11, 2007

(51) Int. Cl.
*H04L 12/26* (2006.01)
(52) U.S. Cl. .................................... 370/230
(58) Field of Classification Search ........... 370/235, 370/229, 230, 230.1, 235.1, 216, 225, 227, 370/228, 329, 332, 338; 710/56, 57, 52, 710/1
See application file for complete search history.

(56) References Cited

U.S. PATENT DOCUMENTS

| 7,423,995 | B1* | 9/2008 | Elliott et al. | 370/332 |
|---|---|---|---|---|
| 2002/0049612 | A1* | 4/2002 | Jaeger et al. | 705/2 |
| 2005/0026616 | A1* | 2/2005 | Cavalli et al. | 455/436 |
| 2005/0147033 | A1* | 7/2005 | Chin et al. | 370/229 |
| 2006/0002297 | A1* | 1/2006 | Sand et al. | 370/235 |
| 2006/0242282 | A1* | 10/2006 | Mullarkey | 709/223 |
| 2007/0177620 | A1* | 8/2007 | Ohmuro et al. | 370/412 |

\* cited by examiner

*Primary Examiner*—Kwang B Yao
*Assistant Examiner*—Andrew Lai
(74) *Attorney, Agent, or Firm*—Blakely, Sokoloff, Taylor & Zafman LLP

(57) ABSTRACT

Data buffer management logic transfers a segment of a data stream over a communication fabric and stores it in a buffer. Then, while data is consumed from the buffer, the rate of consumption and communication fabric status are monitored, and a target minimum level of data in the buffer may be adjusted. If the amount of data in the buffer falls below the target, another segment is retrieved. Systems and software to implement related data buffer management operations are described and claimed.

12 Claims, 5 Drawing Sheets

METHOD AND APPARATUS FOR IMPROVED ISOCHRONOUS DATA DELIVERY OVER NON-ISOCHRONOUS COMMUNICATION FABRIC

FIELD

The invention relates to data transfer and queueing methods. More specifically, the invention relates to improved methods of transferring certain classes of data over general-purpose communication fabrics.

BACKGROUND

Computer and data processing systems deal with many different types of information. Often, this information is retrieved from one place and used in another. Therefore, communication procedures and facilities frequently drive important system design decisions.

In a general-purpose system, the communication facilities may be called upon to carry data with widely varying delivery constraints. Those constraints can be analyzed broadly in terms of integrity and timeliness requirements. For example, some data is expected to be transferred without error, but can tolerate transmission delays to ensure correctness. Other data can tolerate some errors, but must be delivered before a deadline. Information that must be delivered both quickly and correctly may place the most stringent demands on a communication subsystem.

Communication subsystems themselves are often designed to move data as quickly as possible. Even if the communication fabric cannot guarantee data integrity, higher-level protocols can be provided to detect and correct errors. Faster data transmission capability is usually considered to be an unalloyed benefit. However, for some types of data, raw transmission speed is less important than regularity and predictability. For example, multimedia data—that is, data to reproduce audio and/or video signals—may be more sensitive to late delivery than to data errors. If multimedia data arrives late, playback may stall. In contrast, data errors may result in visible or audible glitches, but these may be less intrusive than jerky, stop-and-start performance seen with delayed data.

The characteristics of multimedia data illuminate another communication facility requirement as well. Since a multimedia program is usually replayed in a standard time order, and often in realtime, early delivery of data is not useful. In fact, early-delivered data may increase a system's resource usage, since the data must be stored until it is time to play it.

Multimedia data provides a good example of an isochronous data stream: data to be played back should be received regularly, and neither early nor late. Methods of operating a general-purpose communication facility to achieve these qualities in a data stream may be useful in improving the performance of systems that rely on isochronous data.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION

Embodiments of the invention monitor the performance of a communication fabric while retrieving an isochronous data stream to dynamically adjust a buffering policy so that buffer underruns are less likely to occur, and so that excessive data need not be stored. This can improve system performance in the face of intermittent or transient congestion on the communication fabric.

Figure 1:
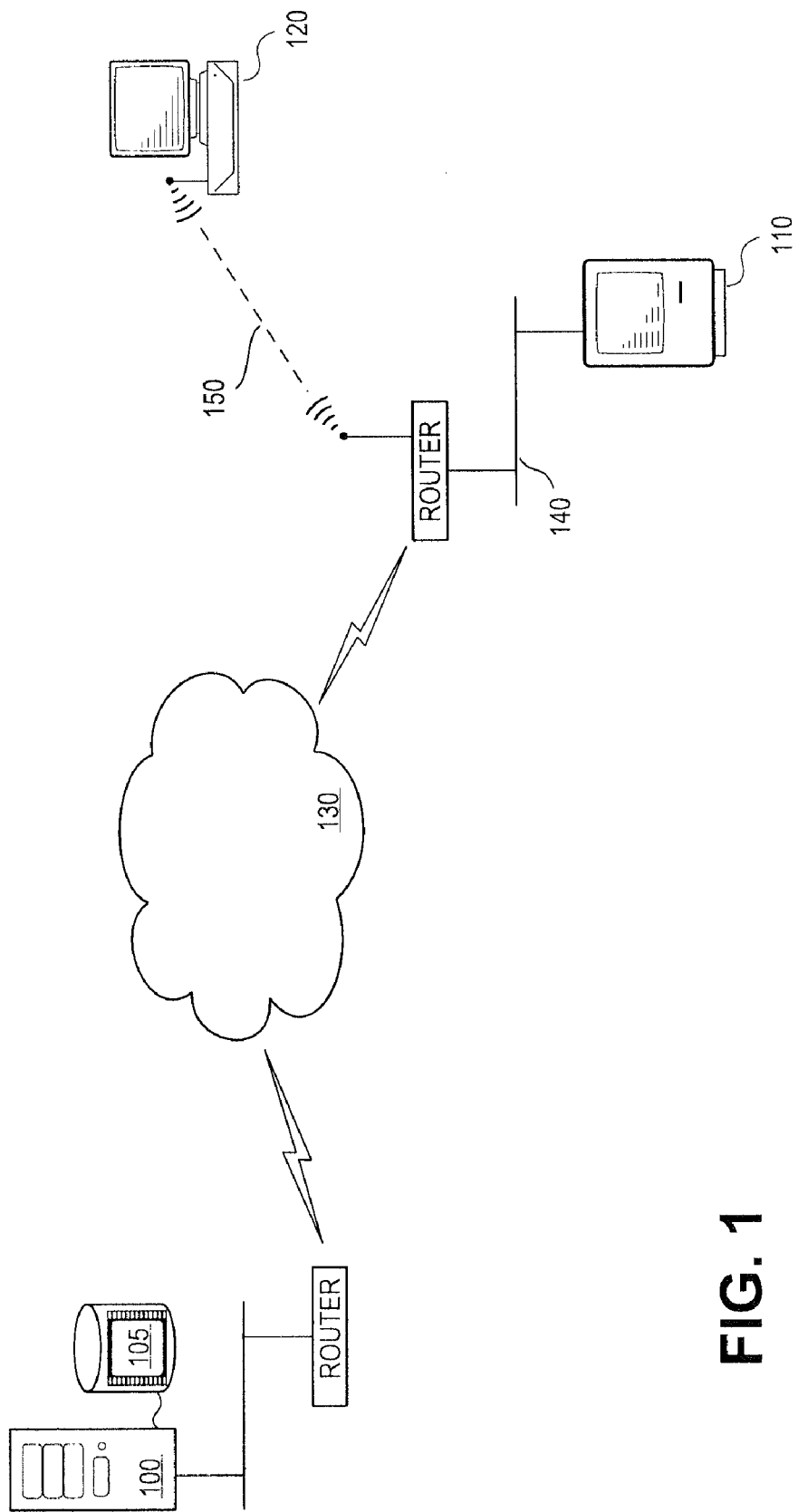
FIG. 1 shows an environment including data processing systems that can benefit from an embodiment of the invention.

FIG. 1 shows an overview of an environment that implements an embodiment of the invention. System 100 is a media server that stores data (such as audio and video data 105) for reproduction or playback on client systems 110 and 120. Element 130 represents a distributed data network that media server 100 and clients 110, 120 can use to communicate. Distributed data network 130 may include many different sub-networks connected by routing nodes (not shown). Sub-networks may carry data in a point-to-point or point-to-multipoint fashion, over electrical (wired) connections, radio signals, optical signals, and the like. In the example environment shown here, data to and from client 110 travels over a wired network 140 such as an Ethernet network at the final (or initial) hop. Data to and from client 120 is transmitted over a wireless network 150 at an analogous point in its journey.

Figure 2:
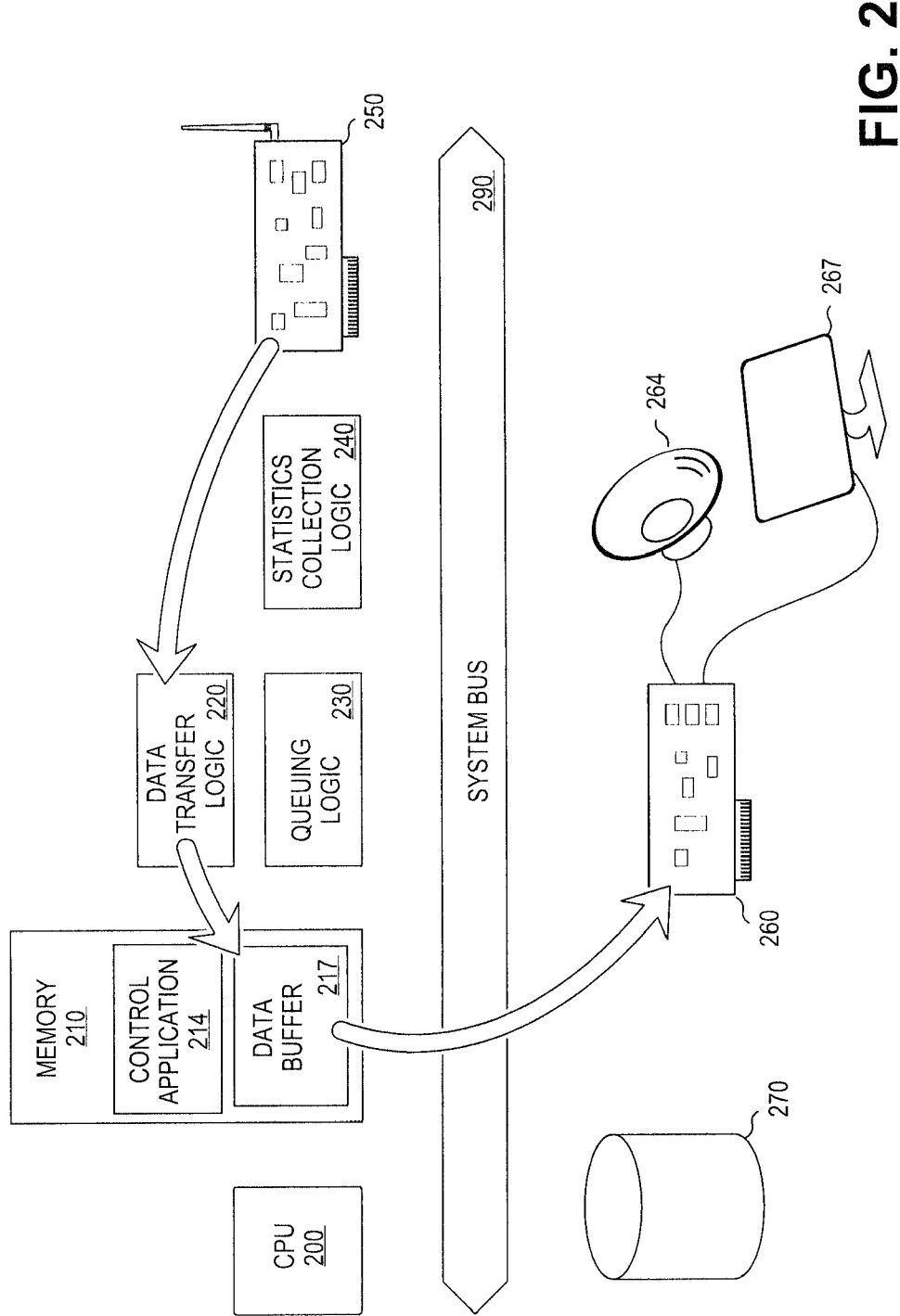
FIG. 2 shows some components of a system that implements an embodiment.

Embodiments of the invention operate at the receiving side of a data connection, so the systems shown as clients 110, 120 in FIG. 1 are depicted in greater detail in FIG. 2. A system may contain a central processing unit ("CPU" or "processor") 200 to execute instructions contained in a memory 210. Instructions to perform various functions may be included; this figure shows control application 214 which may direct and coordinate the operations of other elements. Data buffer 217 stores data retrieved from a source system (such as media server 100 in FIG. 1) until it is to be played by rendering logic 260 on audio presentation device 264 and/or video presentation device 267. Note that the appropriate rendering functions and output devices may depend on the type of data in data buffer 217.

Data to fill data buffer 217 is retrieved from a source over a communication channel to which communication interface 250 provides access. In this figure, communication interface 250 is shown as a wireless network interface, but other types of communication interface may also be used. Queueing logic 230 monitors various aspects of the data flow between source and rendering logic 260 and triggers data transfer logic 220 to retrieve more data when necessary. Details of the operation of queueing logic 230 are described with reference to subsequent figures. Queuing logic 230 may incorporate information from statistics collection logic 240 in its operation. Statistics collection logic 240 gathers information about the state and capacity of the communication channel.

Mass storage device 270 and system bus 290 are discussed later, in reference to an alternate embodiment of the invention.

Figure 3A:
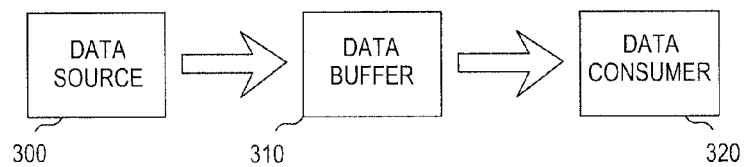
FIG. 3A shows a relationship between three logical entities.

Data processing according to an embodiment of the invention can most easily be understood by reviewing a traditional buffering mechanism. FIG. 3A shows a simple arrangement of a data source 300 that supplies data to a data buffer 310, and a data consumer 320 that removes data from buffer 310. Data can flow from the source 300 into the buffer 310 through a communication fabric at a first rate (the "fill rate"), and is removed from the buffer by the consumer 320 at a second rate (the "drain rate"). Data buffer 310 may permit data consumer 320 to operate without interruption even if the fill rate varies due to circumstances at data source 300 or on the communication fabric.

Figure 3B:
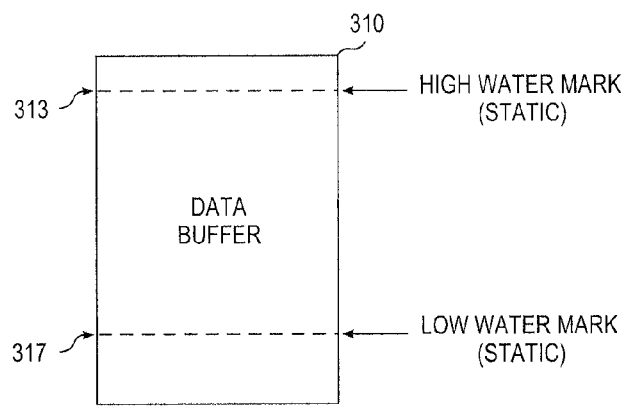
FIG. 3B shows a traditional method of managing a data buffer.
Figure 3C:
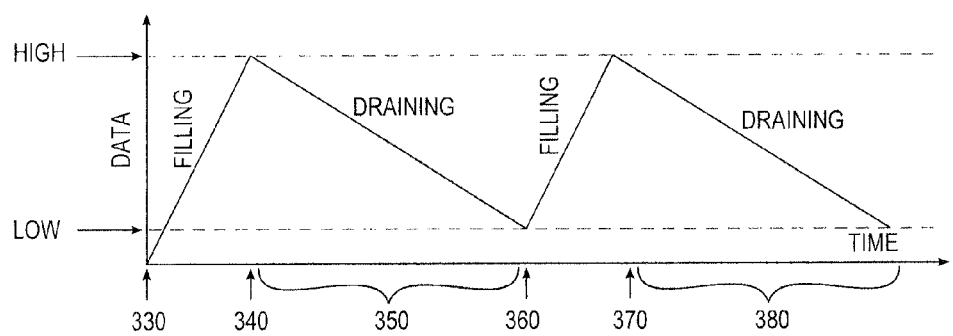
FIG. 3C illustrates the operation of the traditional method under ideal circumstances.

Queueing logic may establish "high water" and "low water" marks within data buffer 310 as shown in FIG. 3B (313 and 317, respectively), and operate to begin filling data buffer 310 if it contains less than "low water" bytes of data, and to stop filling data buffer 310 once it reaches "high water" bytes of data. FIG. 3C shows a graph of the number of bytes of data in data buffer 310 against time: at time zero 330, the buffer is empty, so queuing logic begins filling the buffer at the fill rate. When the buffer fills to the high water mark at time 340, queueing logic stops filling the buffer. Subsequently, the buffer contents are consumed by data consumer 320 at the drain rate (time period 350) until the amount of data reaches the low-water mark at time 360. Queuing logic again begins filling the buffer until its contents reach the high-water mark at time 370; the newly-retrieved data is consumed during time period 380. This buffering scheme may permit an uninterrupted delivery of data to consumer 320 without requiring that all the data from data source 300 be transferred (and stored somewhere) before consumer 320 can begin processing. Of course, the fill rate must equal or exceed the drain rate for this scheme to be effective.

The arrangement described with reference to FIGS. 3B and 3C may be adequate in an ideal environment where fill rates and drain rates are constant, but in a real-world system, fill and/or drain rates often vary, and the traditional buffering scheme can permit buffer underruns to occur.

Figure 4:
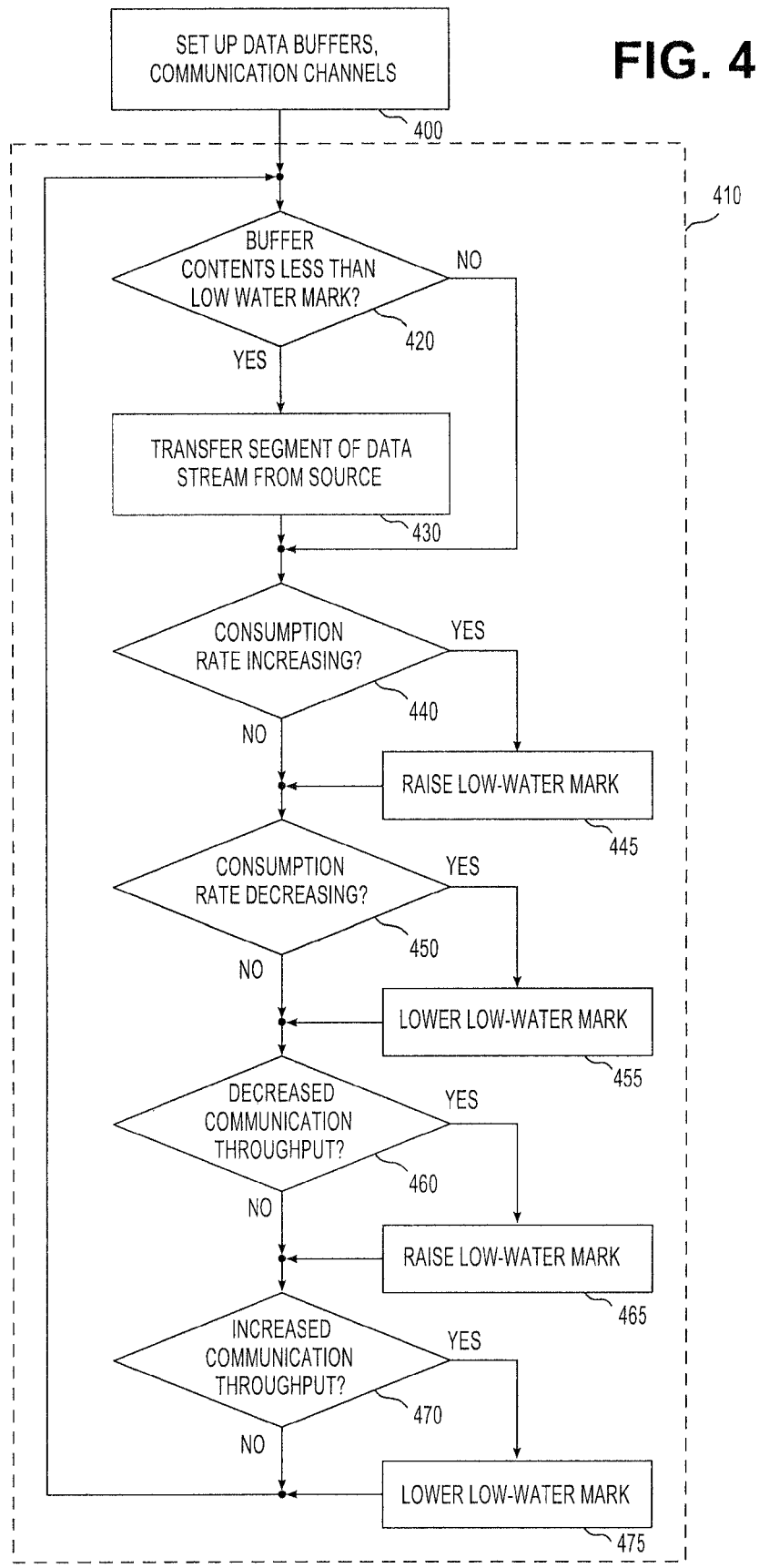
FIG. 4 is a flow chart of buffer management operations according to an embodiment of the invention.

A system implementing an embodiment of the invention can operate as described in the flow chart of FIG. 4 to reduce the chance of buffer underruns. First, data buffers, communication channels, and the like are initialized (400). Default values for buffer size, and high- and low-water marks may be set according to the expected communication channel throughput, data type and estimated consumption rate. Then, while there is more data to be retrieved and processed, the operations within dashed line 410 may be repeated.

If the data buffer contains less data than the low water mark (i.e. less than the target minimum amount of data) (420), queueing logic directs data transfer logic to transfer a segment of data from the source over the communication fabric (425). A segment may be any conveniently-sized block of data. Segments that are too small relative to the communication fabric throughput, latency and per-segment overhead cost may waste time and bandwidth, while segments that are too large may cause the system to be inadequately responsive to changing communication and playback conditions. Some embodiments may select a segment size approximately equal to the Maximum Transmission Unit ("MTU") of the network connection. This is the largest data packet that any of the communication links between server and client can carry without fragmentation, so performance statistics collected while receiving segments of this size may offer a better understanding of network conditions. A simpler embodiment may request the number of bytes necessary to fill the buffer from its current level up to the high water mark, and rely on the underlying transport protocol to break up the transmission appropriately.

Next, the queueing logic monitors factors such as data consumption rate and communication fabric status, looking for some or all of the following conditions. If the consumption rate is increasing (440), the low-water mark of the data buffer is raised (445). If the consumption rate is decreasing (450), the low-water mark is lowered (455). If the status of the communication fabric indicates decreased communication throughput (460), the low-water mark is raised (465). If the status of the communication fabric indicates increased communication throughput (470), the low-water mark may be lowered (475).

The low-water mark may be kept within a fixed or variable range. For example, queueing logic may be designed to prohibit low-water mark values above 50% of the data buffer size, or below 10%. Other specific numerical limits may be appropriate for particular combinations of communication fabric, data buffer size and consumption rates. Upper and lower limits may be dependent upon historical information collected about the current data transfer, or about the performance of the communication fabric in general.

Figure 5:
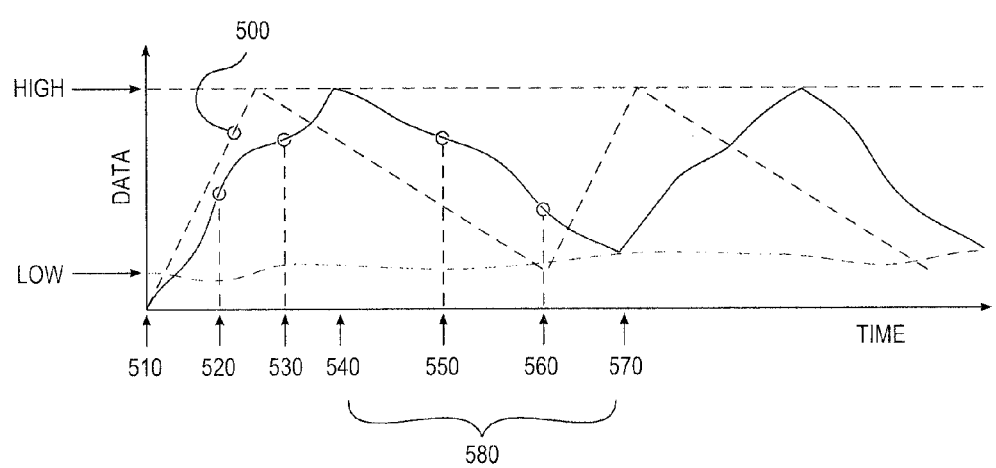
FIG. 5 shows an example of buffer operations in a real-world environment.

FIG. 5 shows a graph of data buffer contents versus time when queueing logic according to an embodiment of the invention is controlling data flow. For reference, the sawtooth-shaped fill/drain curve described in reference to FIG. 3C is superimposed as element 500. At time 510, the buffer is empty, so filling begins. Queueing logic monitors the communication fabric state and data throughput and may adjust the low-water mark accordingly. For example, at time 520, the slope of the data-time line increases, indicating an increased rate of filling, and so the low-water mark may be reduced. Conversely, at time 530, the slope of the data-time line decreases (indicating a decreased rate of filling) so the low-water mark may be increased. Eventually, at time 540, the buffer fills to the high-water mark and queueing logic stops transferring data segments from the source. During time period 580, data in the buffer is consumed. Data consumption rate may also vary, as shown by the changing negative slope of the data-time line, and the low-water mark may be adjusted in correspondence to this parameter also. For example, at time 550, the data consumption rate falls briefly (the line is closer to horizontal), so the low-water mark may be lowered. At time 560, the data consumption rate has risen, so the low-water mark is raised. Finally, at time 570, the data buffer contents intersects the low-water curve and queueing logic resumes transferring data segments from the data source.

Note that an embodiment of the invention could adjust the high water mark instead of (or in addition to) the low water mark to adapt the queuing strategy to prevailing communication fabric and data consumption conditions. When data reception is slow and/or data consumption is fast, the high-water mark may be increased to provide additional insurance against buffer underruns. When data reception is fast and/or data consumption is slow, the high-water mark may be lowered.

Referring once again to the environment shown in FIG. 1, several specific technical details of an embodiment of the invention applied to transfer multimedia data over a distributed data network will be described. This embodiment incorporates standard data formats such as Motion Picture Experts Group ("MPEG"), commonly-used communication fabrics such as Institute of Electrical and Electronic Engineers ("IEEE") standard numbers 802.3 Ethernet (IEEE std. 802.3-REVam-2005, approved Feb. 27, 2004) and 802.11 wireless ("WiFi") (IEEE std. 802.11-1999, reaffirmed 2003), and communication protocols such as the Hypertext Transfer Protocol ("HTTP") operating over the stream-oriented Transmission Control Protocol ("TCP"), which is itself implemented on the datagram-oriented Internet Protocol ("IP").

An MPEG data stream may contain video and/or audio, and may require as little as 8 kilobits per second ("kb/S") to reproduce a low-fidelity audio-only program. Increased audio quality, video, and increased video frame rate and resolution can increase the data communication requirements to 10,000 kb/S or more. Other content encoding schemes can also be used. From low-quality streams through fairly high-quality streams, data delivery requirements fit comfortably within the theoretical delivery capabilities of standard network types. However, actual conditions on a network can significantly impact the ability of the network to deliver multimedia data timely.

802.3 Ethernet and 802.11 WiFi are shared-access network technologies, and although some versions provide theoretical data transfer capabilities of 10 megabits per second ("Mb/S") and 54 Mb/S, respectively, sharing network resources among several users may reduce the bandwidth available to any individual client. Hardware and software to permit a system to transmit and receive data over these types of networks can monitor the network's state and estimate the bandwidth the system can expect to obtain at any time. For example, a network device driver could count data packets and bytes transferred between other stations on the network and subtract those numbers from the network's nominal capacity to estimate the remaining communication capacity, or compute a ratio of successful to failed transmissions to estimate future throughput. Queueing logic can incorporate these estimates in the setting of low- and high-water marks for data buffers.

When queueing logic determines that more data should be retrieved to replenish a data buffer, data transfer logic may contact the data source through an HTTP connection over a reliable, stream-oriented TCP channel. Although HTTP is commonly used to transmit complete data resources such as Web pages and still images, the Internet Engineering Task Force ("IETF") Request For Comments ("RFC") describing the protocol (RFC2616, published June 1999) provides an option to retrieve a specified portion of a larger resource. By using the "Range" protocol option, a client can request a subset of an object such as a multimedia file. Data transfer logic may, therefore, obtain pieces or "segments" of the multimedia data stream when instructed to do so by the queueing logic.

In some embodiments, logic may be provided to detect when an average rate of data consumption exceeds an average rate of data replenishment over a given period of time. Over a longer period, such an excess of consumption is unsustainable and will lead to buffer underruns. Therefore, when excess consumption is detected, a warning signal may be provided to adjust other system operations to avoid a possible underrun. For example, the signal could be used to slow playback slightly, decrease the quality (and therefore the data demands) of the stream, or increase the priority of the system's use of a shared communication fabric.

Although the preceding descriptions have focused on the transfer of multimedia data over a distributed data network, embodiments of the invention can improve data transfer underrun resistance in other environments as well. For example, within a computer system such as the one shown in FIG. 2, a buffered data transfer may occur between storage device 270 and rendering logic 260 over system bus 290. This might occur if the system was configured to play back data stored locally, rather than data retrieved over a network. However, features of this application make an embodiment useful here also. Specifically, data must be delivered timely from storage device 270 to rendering logic 260, but early delivery is not useful. System bus 290 may be shared between other system components, so its full communication capacity may not be available when new data must be provided to rendering logic 260. Queuing logic 230 can operate a data buffer 217 using information about storage device 270, rendering logic 260, and system bus 290 to ensure that enough data will be available, without requiring excessive buffer storage.

An embodiment of the invention may be a machine-readable medium having stored thereon instructions which cause a processor to perform operations as described above. In other embodiments, the operations might be performed by specific hardware components that contain hardwired logic. Those operations might alternatively be performed by any combination of programmed computer components and custom hardware components.

A machine-readable medium may include any mechanism for storing or transmitting information in a form readable by a machine (e.g., a computer), including but not limited to Compact Disc Read-Only Memory (CD-ROMs), Read-Only Memory (ROMs), Random Access Memory (RAM), Erasable Programmable Read-Only Memory (EPROM), and a transmission over the Internet.

The applications of the present invention have been described largely by reference to specific examples and in terms of particular allocations of functionality to certain hardware and/or software components. However, those of skill in the art will recognize that efficient and robust delivery of isochronous data over a non-isochronous communication fabric can also be produced by software and hardware that distribute the functions of embodiments of this invention differently than herein described. Such variations and implementations are understood to be captured according to the following claims.

I claim:

1. A method comprising:
transferring a segment of a data stream over a communication fabric and storing the segment in a buffer, wherein a segment is equal in size to a Maximum Transmission Unit (MTU) of the communication fabric;
monitoring a rate of consumption of data in the buffer and a status of the communication fabric, wherein the status is monitored by
monitoring transactions over the communication fabric to determine an aggregate utilization of the fabric, and
estimating a remaining capacity of the fabric based on the aggregate utilization and a nominal capacity;
adjusting a target minimum threshold for the data buffer according to the rate of consumption and the status of the communication fabric by raising the target minimum threshold if a consumption rate for the data buffer is increasing and reducing the target minimum threshold if the consumption rate for the data buffer is decreasing, and by raising the target minimum threshold if a status of the communication fabric indicates decreased communication throughput and reducing the target minimum threshold if the status of the communication fabric indicates increased communication throughput; and
requesting a next segment of the data stream if an amount of data in the data buffer falls below the target minimum threshold.

2. The method of claim 1 wherein adjusting the target minimum comprises:
increasing the target minimum threshold if the rate of consumption increases; and decreasing the target minimum threshold if the rate of consumption decreases.

3. The method of claim 1 wherein adjusting the target minimum comprises:
   decreasing the target minimum if the status of the communication fabric indicates increased communication throughput; and
   increasing the target minimum if the status of the communication fabric indicates decreased communication throughput.

4. The method of claim 1 wherein monitoring the status of the communication fabric further comprises:
   detecting a first number of successful transmissions over the fabric and a second number of failed transmissions over the fabric; and
   estimating an expected throughput of the fabric based on a ratio of the first number to the second number.

5. The method of claim 1, further comprising:
   generating a warning signal if an average rate of consumption exceeds an average rate of replenishment over a predetermined time period.

6. The method of claim 1 wherein requesting the next segment of the data stream comprises:
   establishing a reliable, stream-oriented connection with a server over the communication fabric;
   transmitting a request for a portion of the data stream; and
   receiving data corresponding to the requested portion.

7. The method of claim 6 wherein the reliable, stream-oriented connection is a Transmission Control Protocol ("TCP") connection.

8. The method of claim 6 wherein the request is a Hypertext Transfer Protocol ("HTTP") request.

9. A non-transitory computer-readable storage medium containing instructions that, when executed by a system containing a programmable processor, cause the system to perform operations comprising:
   monitoring a state of a communication fabric and an amount of data in a data buffer, wherein the state is monitored by
      monitoring transactions over the communication fabric to determine an aggregate utilization of the fabric, and
      estimating a remaining capacity of the fabric based on the aggregate utilization and a nominal capacity;
   if the amount of data falls below a target threshold, requesting additional data from a source via the communication facility; and
   adjusting the target threshold based on the state of the communication fabric by raising the target threshold if a consumption rate for the data buffer is increasing and reducing the target threshold if the consumption rate for the data buffer is decreasing, and by raising the target threshold if a status of the communication fabric indicates decreased communication throughput and reducing the target threshold if the status of the communication fabric indicates increased communication throughput.

10. The non-transitory computer-readable storage medium of claim 9, containing additional instructions to cause the system to perform operations comprising:
    collecting statistics about successful and unsuccessful transmissions over the communication facility; and
    adjusting the target amount according to a ratio between unsuccessful transmissions and successful transmissions.

11. The non-transitory computer-readable storage medium of claim 9 wherein requesting additional data comprises:
    establishing a reliable, stream-oriented connection with the source; and
    transmitting a request for a range of data bytes to the source.

12. The non-transitory computer-readable storage medium of claim 11 wherein the reliable stream-oriented connection is a Transmission Control Protocol ("TCP") connection.

* * * * *